United States Patent
Gruszka et al.

(10) Patent No.: US 10,102,080 B1
(45) Date of Patent: Oct. 16, 2018

(54) ACCESSING DE-DUPLICATION SERVICES FROM AN APPLICATION USING A FILE SYSTEM FILTER DRIVER FOR BACKUP AND RESTORE

(71) Applicant: EMC IP Holding Company LLC, Hopkinton, MA (US)

(72) Inventors: Jerzy Gruszka, Bellevue, WA (US); Matthew D Buchman, Seattle, WA (US); Prashant Shukla, Redmond, WA (US); Amarendra Behera, Bangalore (IN); Krishnendu Bagchi, Bangalore (IN); Michael Jones, Lake Stevens, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 45 days.

(21) Appl. No.: 14/788,103

(22) Filed: Jun. 30, 2015

(51) Int. Cl.
    *G06F 11/14* (2006.01)
(52) U.S. Cl.
    CPC ...... *G06F 11/1453* (2013.01); *G06F 11/1435* (2013.01); *G06F 11/1464* (2013.01); *G06F 2201/84* (2013.01)
(58) Field of Classification Search
    CPC ............. G06F 11/1453; G06F 11/1464; G06F 11/1435; G06F 2201/84
    See application file for complete search history.

(56) References Cited

U.S. PATENT DOCUMENTS

| | | | |
|---|---|---|---|
| 8,156,306 B1* | 4/2012 | Raizen ............... | G06F 3/0608 707/813 |
| 8,458,127 B1* | 6/2013 | Lorch, III ......... | G06F 17/30174 707/617 |
| 9,286,102 B1* | 3/2016 | Harel .................. | G06F 9/45558 |
| 2007/0299891 A1* | 12/2007 | Jopp .................... | G06F 11/1461 |
| 2015/0370652 A1* | 12/2015 | He ....................... | G06F 11/1451 714/19 |

OTHER PUBLICATIONS

Dave Cannon "Data Deduplication and Tivoli Storage Manager" Oxford University TSM Symposium, Sep. 2007.*
Tim Fisher, "File Type Restrictions", Jan. 27, 20015 https://www.lifewire.com/file-type-restrictions-2617915.*
Symantec Desktop and Laptop Option 7.6, Automated protection for desktops and laptops, Data Sheet: Backup and Disaster Recovery, Aug. 2014.*

* cited by examiner

*Primary Examiner* — Rocio Del Mar Perez-Velez
(74) *Attorney, Agent, or Firm* — Stanilord Tomita LLP

(57) ABSTRACT

An application on a client is presented with a target destination for a backup of data managed by the application. The target destination includes a virtual drive. Data backed up by the application to the virtual drive is received. The data is directed to a de-duplication library executing on the client, where the de-duplication library is separate from the application.

20 Claims, 10 Drawing Sheets

405 ⇀

Present to an application on a client a target destination for a backup initiated through the application, the backup including data managed by the application, and the target including a virtual drive
410

↓

Receive data backed up by the application to the virtual drive
415

↓

Direct the data backed up to the virtual drive to a de-duplication library on the client
420

↓

De-duplicate the data and send the de-duplicated data to the backup storage server
425

Application having backup tool
510

↓

File System Filter Driver
515

↓

Callback routines module
520

↓

Client-side De-duplication Library
525

↓

Backup Storage Server
530

FIG. 5

ACCESSING DE-DUPLICATION SERVICES FROM AN APPLICATION USING A FILE SYSTEM FILTER DRIVER FOR BACKUP AND RESTORE

TECHNICAL FIELD

The present invention relates generally to the field of data management, and, more particularly, to backing up and restoring data.

BACKGROUND

Organizations depend on having ready access to their data. Such data may be in the form of databases, computer programs, and files and may include media (e.g., video or audio), images, clinical studies, financial records, user accounts, publications, and the like. The quantity of data that is generated each day by an organization is immense. Data, however, can be lost in a variety of ways such as through disasters and catastrophes (e.g., fires or flooding), media failures (e.g., disk crash), computer viruses, accidental deletion, and so forth. Thus, it is important that the data be backed up. Backing up data is a key function of many organizations.

Some application programs include backup (and recovery) functions for the content generated or managed by the application. Users of the applications may prefer to perform backups using these built-in tools of the application—rather than using a separate backup program—because they may be more familiar with the application as compared to a separate backup program. The separate backup program, however, may offer features that are unavailable in the application.

One example of a feature that the application may not provide includes de-duplication services. De-duplication is a technique for eliminating duplicate copies of data. Data de-duplication is desirable because it helps to conserve computing resources such as by reducing the quantity of data that is stored and managed.

Thus, there is a need to provide access to backup services such as de-duplication when backups are performed through a separate application.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 4 shows another flow diagram of a backup according to a specific embodiment.

FIG. 5 shows a call stack of a backup according to a specific embodiment.

DETAILED DESCRIPTION

Figure 1:
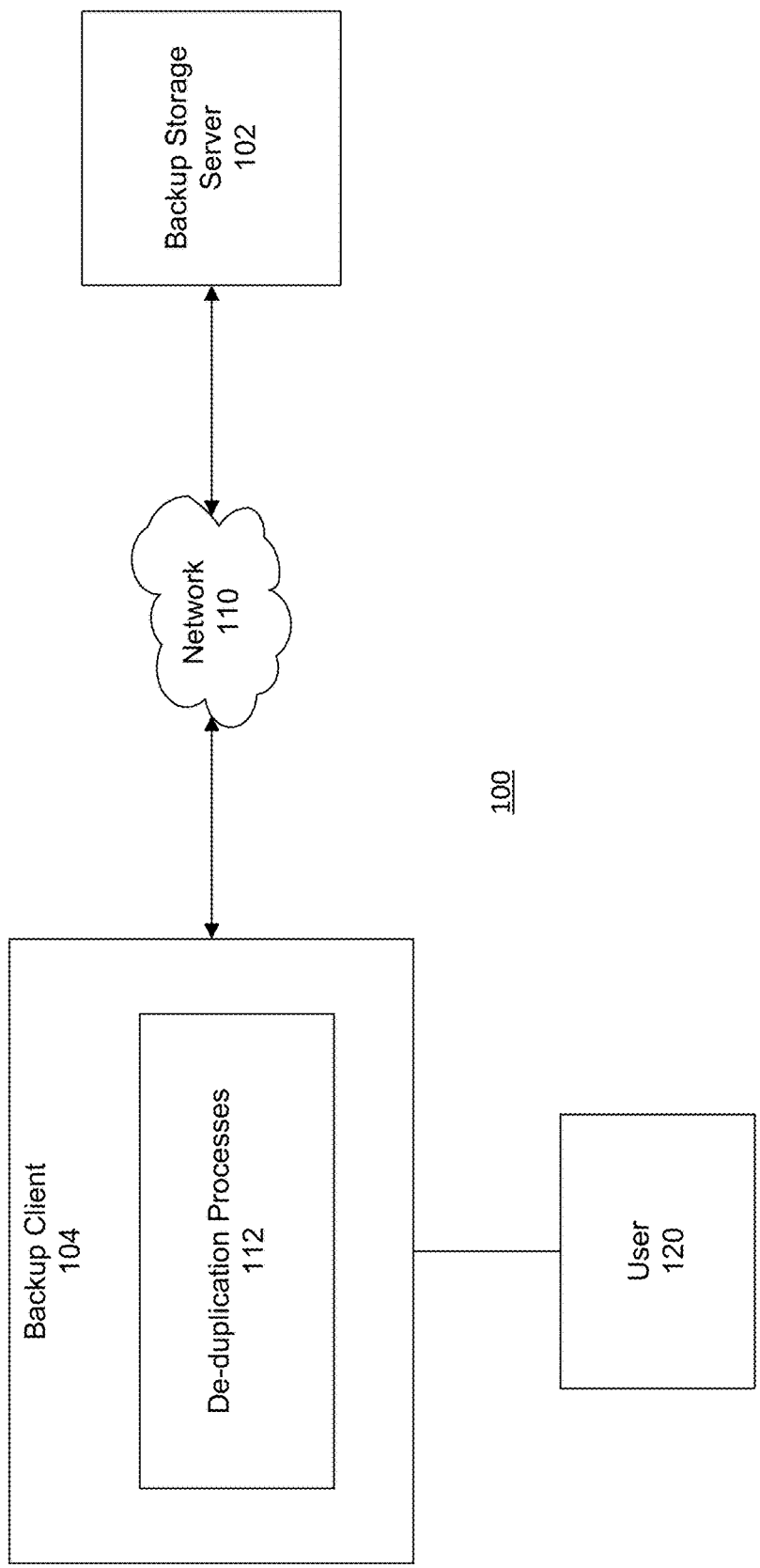
FIG. 1 is a diagram of a large-scale network implementing a data backup and recovery process that provides for accessing de-duplication services from an application using a file system filter driver, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for accessing de-duplication services from an application using a file system filter driver. Some embodiments of the invention involve backup and recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a system for accessing de-duplication services from an application using a file system filter driver. In system 100, a number of clients 104 are provided to serve as backup clients or nodes. A network server computer 102 is coupled directly or indirectly to these clients through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

For the embodiment of FIG. 1, network system 100 includes a server 102, and one or more backup clients 104 that execute de-duplication processes 112 for a backup of client data when the backup is initiated by a user 120 at the client. The backup may be a full or incremental backup of one or more files.

In an embodiment, system 100 may represent a Data Domain-based deduplication storage system provided by EMC Corporation. For example, the backup storage server may include an EMC Data Domain Server. Data Domain Server is a disk based de-duplication system having built-in intelligence. However, other similar backup and storage systems are also possible. System 100 may utilize certain protocol-specific namespaces that are the external interface to applications and include NFS (network file system) and CIFS (common internet file system) namespaces, as well as a virtual tape library (VTL) or DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files. DD Boost is a high-speed client-side data de-duplication system.

Figure 2:
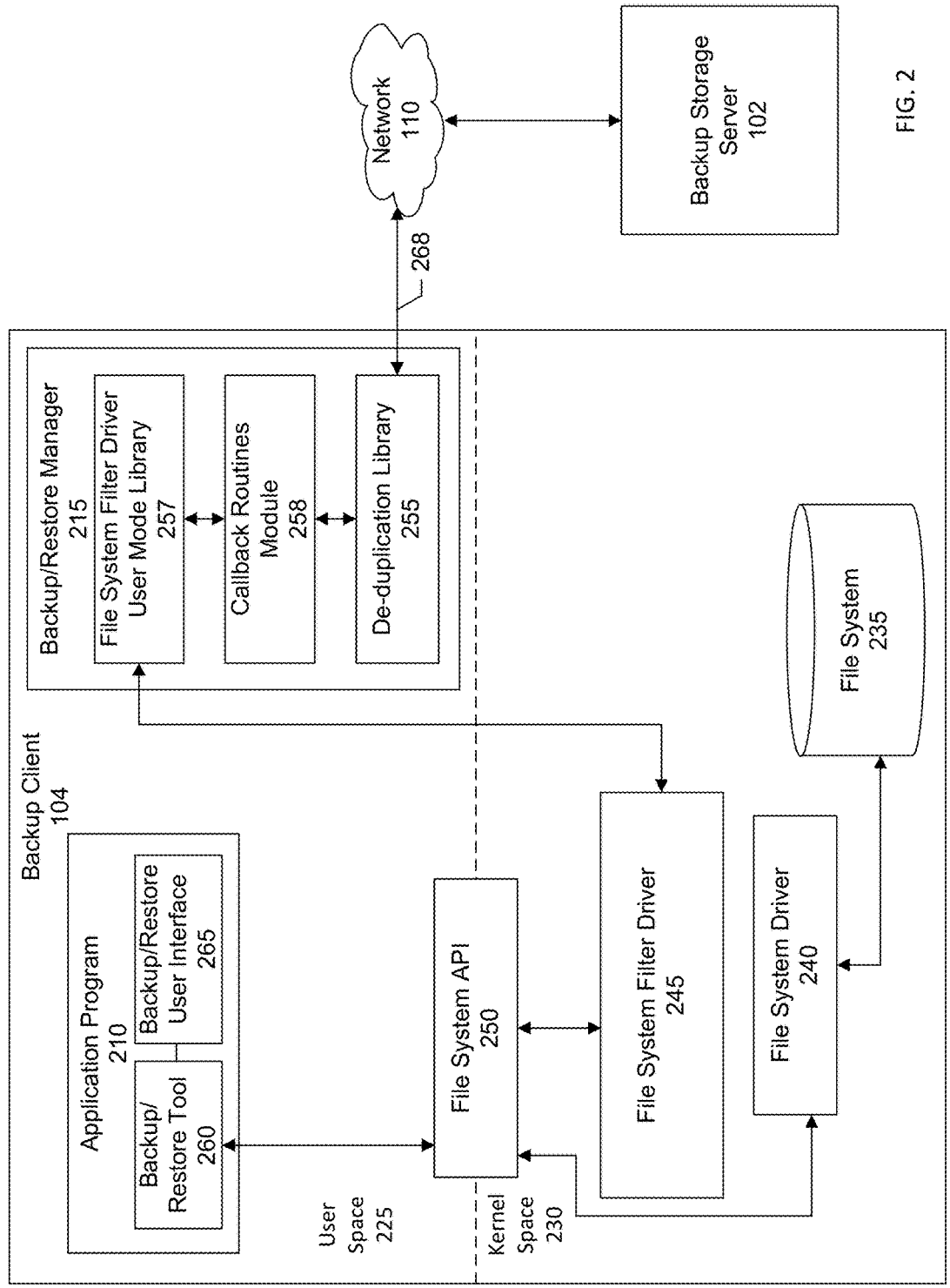
FIG. 2 shows an overall architecture of a system for backup and recovery.

FIG. 2 shows various components of the backup client of FIG. 1 that support accessing de-duplication services from an application during a backup. As shown in the example of FIG. 2, backup client 104 includes an application program 210 and a backup/restore manager 215 running in a user space environment 225 of the client. The client further includes, running within a kernel space environment 230 of the client, a file system 235, a file system driver 240, and a file system filter driver 245 between the file system driver and a file system application programming interface (API) 250. The file system API provides a standard interface to the file system or storage device (e.g., hard drive C:) for use by the application. The file system driver provides services for accessing the file system on the disk drive.

The backup manager in conjunction with the file system filter driver is responsible for facilitating the efficient backup and restoration of data on the client. In a specific embodiment, the backup manager includes a client-side deduplication library or engine 255, a user mode library 257 that may be referred to as a callback file system (CBFS) user mode library, and a callback routines module 258. De-duplication is a technique to help eliminate duplicate or redundant copies of data by replacing such data with a reference or pointer to the actual data. De-duplication is desirable because it can help to conserve computing resources and improve storage utilization.

A feature of the system shown in the example of FIG. 2 provides the ability to seamlessly backup and restore content to/from a de-duplicated storage system using the unmodified native application that manages that content. In a specific embodiment, the system allows backup operators to backup and restore Microsoft SQL databases to a de-duplication system from within the native Microsoft SQL Server Management Studio Application (SSMS) without any modifications or additions to the application itself. SQL Management Studio is an application that manages Microsoft SQL Server. Backup operators can take full advantage of the application's native backup/restore functionality using their existing knowledge and no new skills are required to use the system. A backup application may read data from SQL Server through a VDI interface and may save that data in a format exclusive to the backup application. It should be appreciated that while some embodiments are shown and described in conjunction with Microsoft SQL Server Management Studio, aspects and principles of the system can be applicable to other applications having a native or built-in backup tool for the backup and recovery of the data managed by the application.

More specifically, some applications, such as Microsoft SQL Server Management Studio, natively provide functionality to backup and restore data (e.g., SQL Server databases). However, the applications may lack the ability to store the backups to a de-duplication storage server using client-side de-duplication such as EMC DD Boost. For example, during a backup, the backup administrator may access from within the application program a backup (and restore) tool 260 that is native, built-in, or integrated with the application program. The backup tool may present the administrator with an interface 265 that the backup manager can use to select the data managed by the application to be backed up and select a destination of the backup. In some cases, the backup tool restricts the target destination of the backup to certain types of devices such as disk, tape, or both. A disk target may include a local disk or a network share. A network share is a space on a server, remote from the client that is accessible over the network.

Upon the administrator selecting the data to be backed up and the target backup destination, the backup tool issues requests to the file system API which in turn communicates with the file system driver to access the file system on the disk drive to backup the data to the selected backup target destination. A data path of the backup may be from the file system to the backup target destination and thus bypass the de-duplication services provided by client de-duplication library 255. In other words, the backup data will not pass through the client de-duplication library. Instead, the backup data may simply pass through the client protocol stack for the network file system on the client to the backup target destination. As a result, the backed up data may include redundant data that is transmitted over the network to the backup storage server. The redundant data can thus negatively impact network performance and increase utilization of storage space.

Using add-ins to the application (e.g., SQL Server Management Studio) in order to access client-side de-duplication services such as DD Boost are problematic and can negatively impact performance because such add-ins may require the backup operators to learn new functionality and procedures, lack the full functionality of the native application, and need to be constantly updated to stay current with any new features constantly being added by the application developer (e.g., Microsoft) to the application product (e.g., SQL Server Management Studio). In particular, add-ins can require the backup administrator to learn a new user interface, learn a new set of command line interfaces, rewrite existing scripts to automate the current backup/recovery process, or combinations of these. Having to navigate through unfamiliar and various different interfaces can be a very frustrating experience. Further, rewriting existing backup scripts, recovery scripts, or both is a very labor intensive processes.

In a specific embodiment, a feature of the system facilitates accessing de-duplication services from an application using a file system filter driver for backup and restore purposes to allow the user to take full advantage of the familiar native backup and restore functionality that the application (e.g., Microsoft SQL Server Management Studio) provides while also providing the benefits and services of a client side de-duplication system. Some benefits of the system include:

1) No new User Interface from Add-In integration is required.

2) Any additional functionality added by the developer (e.g., Microsoft) is automatically available.

3) Client-side de-duplication services (e.g., DD Boost) can increase performance by distributing the de-duplication process to the backup server. The client-side de-duplication service can limit network traffic during the backup as only unique data segments are sent to the storage server. A client-side deduplication service such as DD Boost may speed up backups by 50 percent, use up to 99 percent less bandwidth, and reduce backup server workloads by up to 40 percent.

4) Backup operators can use the same, already familiar to them command line interfaces, graphical user interfaces, or both. The seamless integration of the native backup capability of an application with the client de-duplication library helps to improve the user experience.

5) Existing backup and restore scripts, regardless of their complexity, can still work without any modification.

In a specific embodiment, the application program and backup manager are separate or different programs. For example, the application program and backup manager may be from different vendors. The application program may be provided by a first vendor. The backup manager (e.g., de-duplication library) may be provided by a second vendor, different from the first vendor. The application program and backup manager may execute independently of each other.

The application program includes the backup tool which is designed to backup and restore data managed, generated, created, accessible, recognized, or stored by the application program. Other data that is not managed, generated, or stored by the application program may not be able to be backed up using the native backup tool of the application. For example, the application program may store data in one or more particular file formats (e.g., .mdf). The backup tool may allow backups and recovery of content (e.g., data or files) stored in the one or more particular data formats recognized by the application program and may not allow or may not be capable of backups and recovery of content stored in another data format not recognized by the application program. For example, SQL Server Management Studio can be used to backup SQL Server databases only. Other databases that are not SQL Server databases may not be able to be backed up using SSMS. The user interface of the backup tool of the application program may restrict the selection of other data files in other data formats that are not managed by the application program.

A file format is the layout of a file in terms of how the data within the file is organized or encoded. A program that uses the data in a file must be able to recognize and possibly access data within the file. The file format specifies a specific structure or arrangement of data code stored as a computer file. A file format tells the computer how to, for example, display, print, and process, and save the data. Generally, the file format is set by the application program which created the file, and the operating system under which it was created and stored. In many cases, file formats are incompatible with one another and may not be usable by other applications running under the same operating system, or the same application running under a different operating system. The file format may or may not be a proprietary format.

The file system filter driver is responsible for receiving or intercepting requests from the application program to the file system and calling a set of libraries, modules, components, subprograms, or routines that may be running in user mode. The file system filter driver executes in the kernel. Kernel space and user space each have their own memory address spaces. Code running in the kernel is at a different privilege than code running in user mode.

In particular, there are fewer restrictions when running in the kernel. This allows the file system filter driver to redirect, reroute, alter, change, or modify a backup data path of the backup tool of the application to the backup manager for the de-duplication services. That is, the data path of the backup may be altered so that the data path passes through the client de-duplication library. Because the file system filter driver runs at a more privileged mode than the application program, the file system filter driver is able to redirect commands from the application program to the backup manager. Further, the redirection can be performed without modifying the application program such as through add-ins to the application program that may operate in user space.

The de-duplication services can alter the data being written to a backup disk (or read from) such as by replacing redundant data with pointers or other references. Data that is redundant can be identified at the client and before the data is transmitted over the network. As a result, network bandwidth can be conserved because a reference to the data, rather than the actual data content itself, may be transmitted. Storage space is conserved because redundant pieces of data may not be stored. De-duplication thus helps to speed the backup and recovery process.

The file system filter driver is responsible for creating a virtual file system, volume, and disk to expose and manage remote data as if they were files on the local disk. In a specific embodiment, the file system filter driver is referred to as a callback file system (CBFS) or a pluggable file system. The file system filter driver provides a framework to create a virtual file system. In particular, a virtual file system is created on the client that presents to the backup tool of the application a virtual or synthetic drive as a local target destination for the backup.

The virtual drive is mounted and thus visible to the application, but is not an actual drive. The virtual drive emulates a physical storage device so that the application believes it is writing to local disk. For example, the virtual drive may be assigned a drive letter (e.g., "P:"). Thus, the file system operations associated with the backup or recovery that are requested by the application (e.g., create a file, write to the file, read from the file, and so forth) are performed against that virtual or synthetic disk. In particular, when the application writes to the virtual drive the data is passed to the client de-duplication library for de-duplication. The de-duplicated data can then be transmitted 268 from the client to the backup storage server.

After the backup is completed, the virtual drive may be deleted, unmounted, or dismounted. Alternatively, the virtual drive may be left mounted. There can be a user-configurable setting as to whether the virtual drive is mounted before each backup and dismounted after the backup or left mounted. For example, in some cases, a user may prefer to mount and dismount the virtual drive for each backup so that the virtual drive is not accessible between backups. This can help to ensure that the virtual drive is not inadvertently accessed. In other cases, a user may prefer to leave the virtual drive mounted so that it is readily available for backups.

The file system filter driver may provide, for example, directory enumeration callback functions, calls for opening a file, calls for closing a file, calls for reading a file, calls for writing a file, calls for retrieving file security, and so forth. User mode library 257 stores a set of callback functions that are invoked by the file system filter driver when file system calls associated with a backup, recovery, or both are being serviced. A callback function is a piece of executable code that is passed as an argument to other code, which is expected to callback (execute) the argument at some particular time. The invocation may be immediate as in a synchronous callback, or it might happen at later time as in an asynchronous callback.

Callback routines module 258 provides a bridge or translation between the user mode library and the client de-duplication library. The callback routines module implements a set or collection of various file system function calls. For example, the callback routines module may receive a read call to obtain a file handle of a file that had previously been opened. The callback routines module can translate the call to the corresponding file that had previously been opened by the de-duplication library. The callback routines module may provide for caching such as caching open file handles that are open with the de-duplication library. Caching can help to increase system performance.

In a specific embodiment, the file system filter driver is referred to as the Eldos Callback File System (CBFS) as provided by Eldos Corporation of London, United Kingdom and the user mode library is referred to as the Eldos user-mode CBFS library. It should be appreciated, however, that the Eldos file system filter driver and user mode library are merely examples of a specific embodiment. Aspects and principles of the system may be implemented using a different file system filter driver, user mode library, or both. Further, FIG. 2 is merely illustrative of an embodiment. The blocks can be functional rather than structural so that it is possible to have many different hardware configurations that can perform the illustrated functions. Implementation of the functional entities may vary. For example, in some cases the user mode library and callback routines module are combined into one code module. In other cases, the user mode library and callback routines module reside in separate code modules. One of ordinary skill in the art would recognize other variations, modifications, and alternatives.

Figure 3:
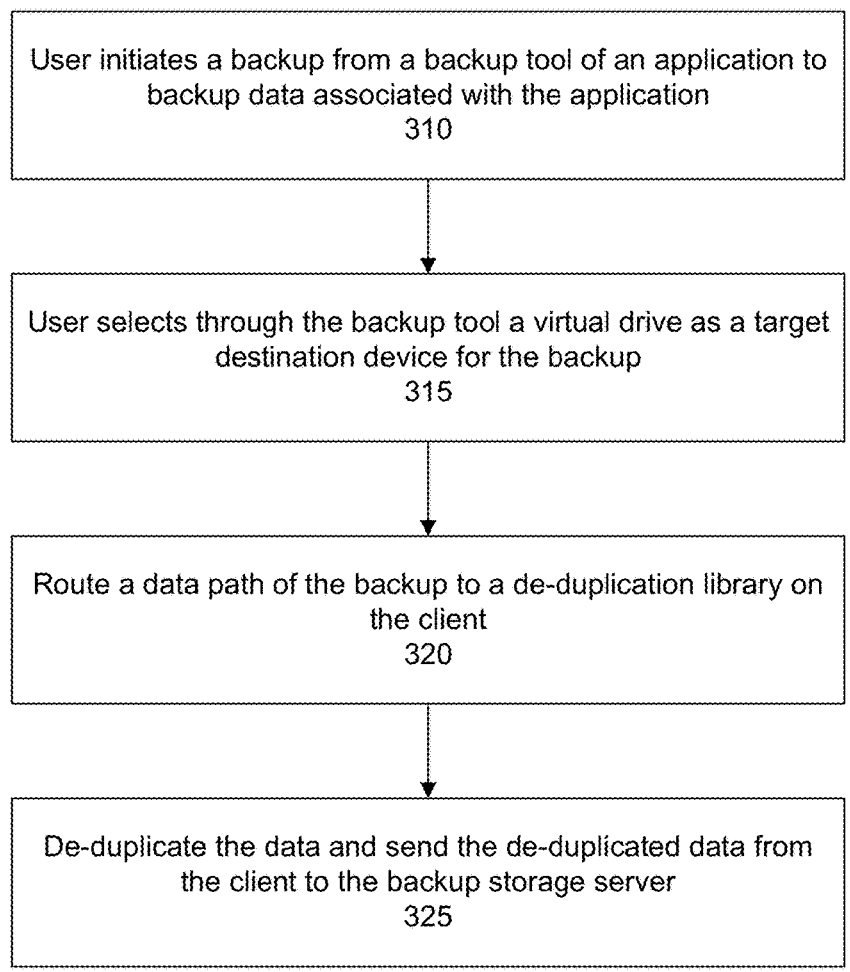
FIG. 3 shows a flow diagram for a backup according to a specific embodiment.

FIG. 3 shows an overall flow 305 of a client backup. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 310, a user, such as a backup administrator, initiates a backup from a backup tool of an application on a client to backup data associated with the application. For example, the user may, from within the backup tool of the application, select an option "backup." The user may, from within the backup tool of the application, select or identify the content (e.g., data or files) managed by the application as the source or data to be backed up. For example, the content may include data or files generated by the application, created by the application, controlled by the application, configured by the application, or combinations of these.

As discussed above, in a specific embodiment, the backup is initiated manually (e.g., by the backup administrator). More particularly, in some cases, the backup administrator may prefer to manage the backups themselves. So, there can be a desire to initiate a backup manually rather than initiating the backup automatically such as through an agent installed on the backup client. For example, there can be conflicts, compatibility issues, or other problems that may arise when trying to install an automatic backup agent. So, a backup administrator may prefer backing up manually. In other specific embodiment, however, the system may be configured for de-duplication with an automatic backup agent installed on the client.

In a step 315, the user selects through the backup tool of the application a virtual drive as a target destination device for the backup. In a step 320, the system routes a data path of the backup to a de-duplication library on the client. In a step 325, the data is de-duplicated at the client and the de-duplicated data is transmitted from the client to the backup storage server. De-duplicating the data at the client helps to reduce the number of bytes that are sent over the network.

In a specific embodiment, the client de-duplication library implements a de-duplication technique that may be referred to as global de-duplication. In this specific embodiment, each client maintains a hash table or other index of the data stored on a corresponding storage system. The contents of the hash table are reported to a de-duplication server that maintains a master hash table of all the data on all of the storage systems in the system architecture.

Each client, through the de-duplication library, identifies duplicate or redundant data so that rather than being backed up to backup storage, a pointer or other reference can be created that points to a single instance of the data stored on any of the storage systems in the architecture. For example, the client de-duplication library may break a file into blocks and hash each block. The de-duplication library compares the hash for each block to the hash table maintained at the client. If a new hash is identical to an existing hash in the hash table, the data corresponding to the new hash does not need to be backed up and the de-duplication library can create a pointer to a single instance of the data already stored on the storage system.

If a new hash is different from hashes in the hash table, the de-duplication library adds the new hash to the hash table, and communicates with the de-duplication server to determine whether the data is stored on a different storage system. For example, the de-duplication library may send the new hash to the de-duplication server. The de-duplication server checks the new hash against the master hash table. If the new hash is identical to a hash already in the master hash table, indicating that the corresponding data is already stored on one of the other storage systems, the de-duplication server sends the location of the corresponding data to the client. The client de-duplication library can then release the duplicate data and store a pointer or reference to a single instance of the data already stored on a different storage system. The client de-duplication library may also update its hash table with the location of the data corresponding to the new hash just added to the hash table.

If the new hash is different from the existing hashes in the master hash table, indicating that the corresponding data is not stored on any of the other of storage systems, the de-duplication server stores the new hash in the master hash table, along with the location of the corresponding data on the storage system. The de-duplication server informs the client de-duplication library that the corresponding data is not a duplicate and the client stores the data in the storage system. The client de-duplication library can update its hash table with the location of the data in the storage system. A specific embodiment of global de-duplication is further discussed in U.S. Pat. No. 8,190,835, issued May 29, 2012, which is incorporated by reference along with all other references cited herein.

Figure 6:
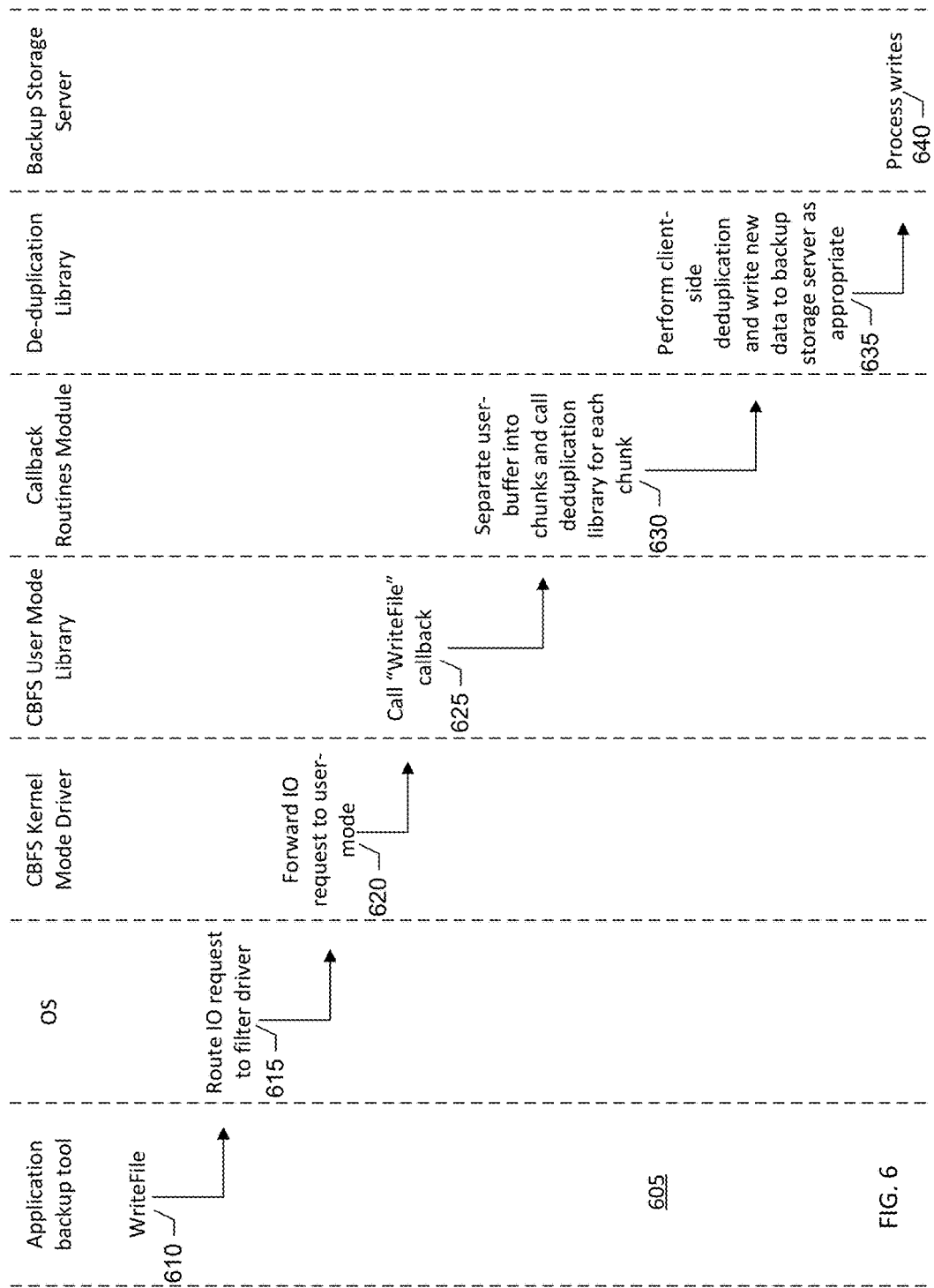
FIG. 6 shows an example of a sequence diagram for a backup according to a specific embodiment.

FIG. 4 shows a more detailed flow 405 of a client backup. FIG. 5 shows a call stack 505 for the client backup. FIG. 6 shows a sequence diagram 605 of the client backup. Referring now to FIG. 4, in a step 410, an application on a client is presented with a target destination for a backup initiated through the application. The backup includes or identifies data managed by the application. The target destination includes a virtual or synthetic drive.

More particularly, in a specific embodiment, a file system filter driver is provided that provides or exposes a virtual drive to a backup tool of an application on a client as a target destination for the backup. The file system filter driver creates a virtual file system on the client that is exposed to the operating system (e.g., Windows OS) so that the application can access the virtual drive.

The file system filter driver is installed on the backup client which allows for the mounting of a virtual drive using a drive letter, e.g., "P:\." This virtual drive is visible to the operating system as a local drive and can be browsed with, for example, Windows File Explorer or Open Dialog just like any other local drive by navigating to the drive letter assigned to the virtual drive, e.g., "P:\." In a specific embodiment, the file system filter driver redirects all writes to the virtual drive (e.g., "P:\ drive") and into the client de-duplication library (e.g., DD Boost) and backup storage server (e.g., Data Domain).

In a step 415, the system receives data backed up by the application to the virtual drive. The file system filter driver may receive or intercept a file system call issued by the backup tool and associated with a data path of the backup before the file system call is received by the file system.

In a step 420, the system directs the data backed up to the virtual drive by the application to the de-duplication library executing on the client. For example, based on the file system call, the data path of the backup is directed to the de-duplication library on the client to de-duplicate the data before the data is sent to the backup storage server. The file system filter driver receives the backup data directly from file system API calls. The API calls pass a data buffer to the file system filter driver which includes the data. During the writing of backup files, the files are created on the virtual drive such that the operating system forwards the requests to the file system filter driver during I/O request processing inside the kernel. I/O requests associated with reading backup files may be similarly processed.

In a step 425, the client de-duplication library de-duplicates the data and sends the de-duplicated data to the backup storage server. In a specific embodiment, the data is sent from the client de-duplication library to the backup storage server over a fiber channel communication link. For example, the system shown in FIG. 2 supports a feature referred to as fiber channel interconnect and a communication link between the client de-duplication library and the backup storage server may include a fiber channel. The client de-duplication library can support multiple connections. For example, in some cases there may be another application on the client having an add-in designed to access the de-duplication library. The de-duplication library allows the application having the add-in to create an independent connection to the de-duplication library to read/write from/to the backup storage server. The add-in does not have to be uninstalled.

A backup may include writing to a new backup file or writing to an existing backup file (e.g., appending to a file). Using the native backup tool of the application, a user may decide to create a new file to store the backup data or append the data to another existing file. Callback routines module 258 (FIG. 2) may include routines for a differencing disk to hold the writes while preserving the original file data as it exists on the data storage server. For example, the application program may allow the user to select a differential backup of content managed by the application. A differential backup can capture the data that has changed since the most recent full backup. Since a differential backup may record only the changes since the last full backup, creating a differential backup can be much faster than creating a full backup.

In this specific embodiment, the system provides the application with a virtual drive to which changes since the last full backup are written. The system can direct the changed data blocks written to the virtual drive to the client de-duplication library. The client de-duplication library, in turn, can write the de-duplicated changes to an incremental backup file on the backup storage server. The system can append, link, or associate the incremental backup file with the full parent backup. There can be any number of incremental backup files that may be appended, linked, or associated with the full parent backup.

FIG. 5 shows an example of a call stack 505 for a backup of the client. In a step 510, there is an application on the client having a native backup tool. In a step 515, the file system filter driver receives a file system call associated with a backup initiated from the backup tool of the application. The backup may be initiated by a user using the backup tool of the application. In a step 520, the file system call is routed to the callback routines module. In a step 525, the data to be backed up associated with the file system call is forwarded to the client de-duplication library for de-duplication processing. In a step 530, the de-duplicated backup data is transmitted to the backup storage server for backup storage.

FIG. 6 shows an example of a sequence diagram 605 for a backup of the client. In a step 610, the application backup tool issues a WriteFile file system call to the operating system. In a step 615, the operating system routes the I/O request to file system filter driver 245 (FIG. 2). In a step 620, the file system filter driver forwards the I/O request to callback file system user mode library 257 (FIG. 2). In a step 625, the callback file system user mode library calls a "WriteFile" callback to callback routines module 258 (FIG. 2).

In a step 630, the callback routines module processes the backup data for the client de-duplication library. The processing may include, for example, separating the user-buffer into a set of chunks and calling the de-duplication library for each chunk. For example, the de-duplication library may specify a particular size of a block for de-duplication. The callback routines module may receive a write file data block having a first size and divide the data block into a set of smaller chunks or writes for the de-duplication library, each chunk having a second size, less than the first size.

In a step 635, the chunks are de-duplicated. For example, the de-deduplication library may be called by the callback routines module to de-duplicate a first chunk of the set of chunks. After the de-duplication of the first chunk, the callback routines module may call the de-duplication library to de-duplicate a second chunk of the set of chunks. The de-duplication library performs client-side de-duplication and writes new data to the backup storage server as appropriate. In a step 640, the backup storage server processes the writes from the client de-duplication library.

Consider, as an example, a request to backup a SQL database initiated though SQL Server Management Studio. A virtual drive is presented to the application (e.g., SQL Server Management Studio) as a target destination for the backup (e.g., "P:\backup_filename.bak" where "P" is the drive letter assigned to the virtual drive and "backup_filename.bak" is the filename of the backup file). SQL Server Management Studio may then use the Windows API (e.g., Win32 API) to enumerate the drive to see if the file exists, determine that the file does not exist, create the file, and then begin performing writes to the file (e.g., read the blocks of data associated with the database to be backed up and write the blocks to the backup stream).

These file I/O operations are performed against the virtual drive. More particularly, an API call (e.g., enumerate directory or open file) may be received by the file system filter driver (or callback file system), which then calls the callback file system user mode library, which in turn calls the callback routines module, and which in turn calls the de-duplication library to, for example, create the backup file on the backup storage system.

In a specific embodiment, the de-duplication library backs up the data to a storage unit of the backup storage system. A file system can be created within the storage unit and the backup file can be added to the file system. The de-duplication library provides an interface to access the storage unit. When the application (e.g., SQL Server Management Studio) writes to the virtual drive, the Windows API write call is received by the file system filter driver and passes through to the de-duplication library for the de-duplication library to execute a write call to the backup file on the storage unit of the backup storage system. In this specific embodiment, the de-duplication library is called while the application program (e.g., SQL Server Management Studio) is writing to the virtual drive.

FIGS. 7-12 show screen shots of user interface screens of a specific embodiment of the system that was built as a prototype to prove operability. In this specific embodiment, the backup storage system included the EMC Data Domain System as provided by EMC Corporation and the backup was initiated through Microsoft SQL Server Management Studio as provided by Microsoft Corporation.

Figure 7:
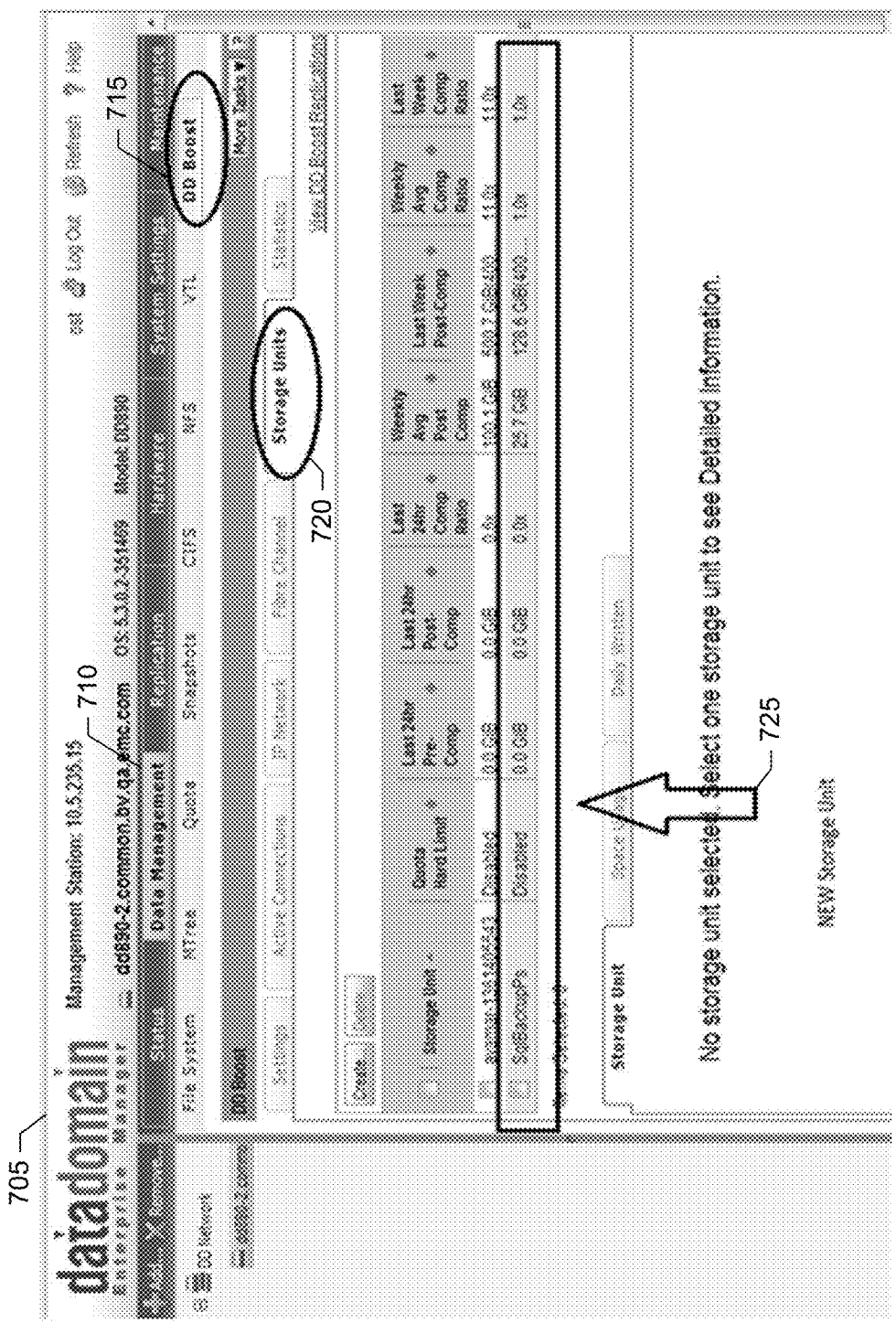
FIG. 7 shows an example of a screen shot of a management console of a backup data management system.

FIG. 7 shows a screen shot of a management console of a Data Domain Enterprise Manager 705. This screen shot is a view of the management console after the file system filter driver has been installed and the virtual drive mounted. The selected tabs include "Data Management" 710→"DD Boost" 715→"Storage Units" 720. A successful mount creates a new storage unit 725 (e.g., "SqlBackupPs") on the Data Domain System.

Figure 8:
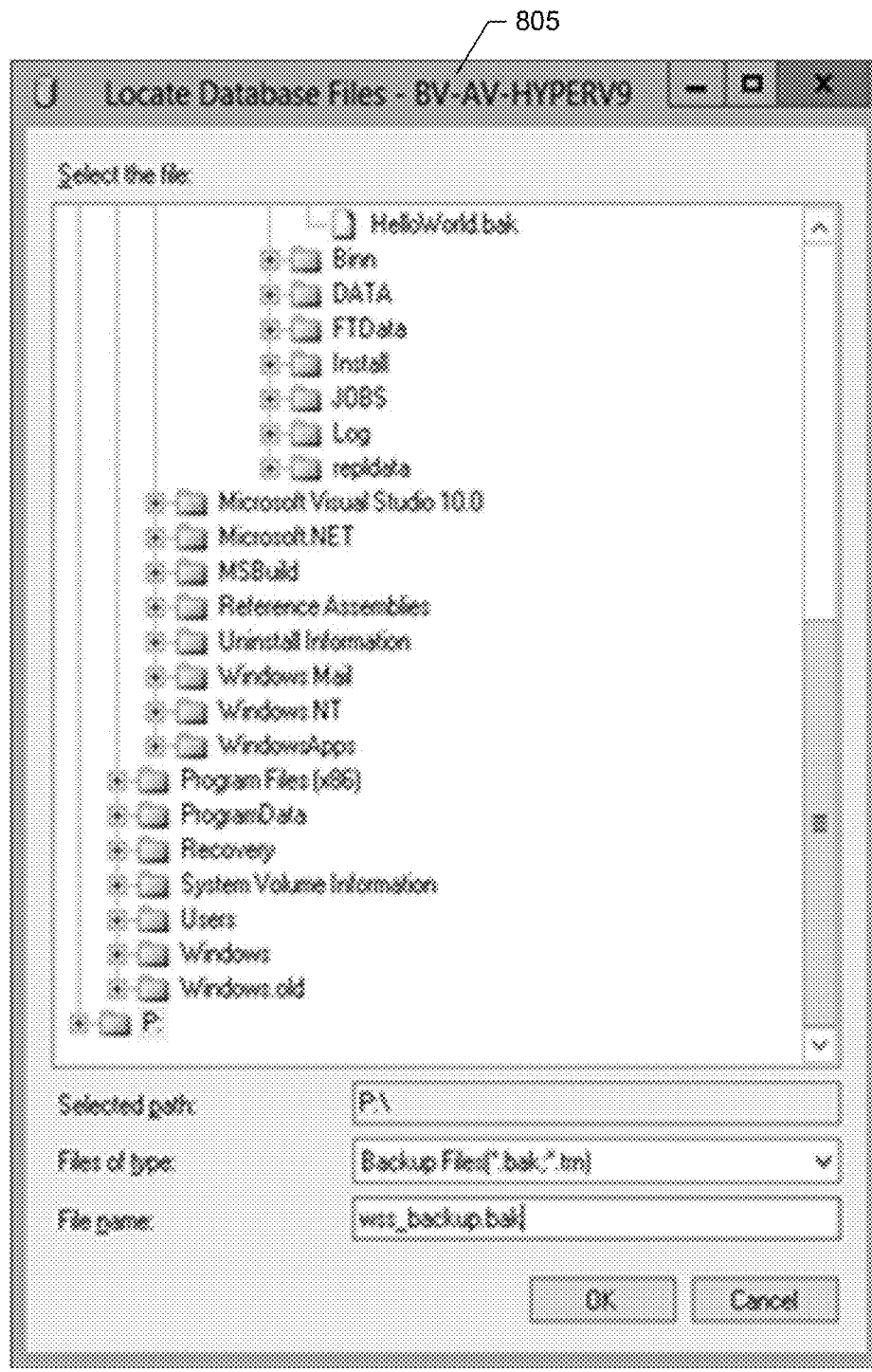
FIG. 8 shows an example of a screen shot of a backup being initiated from within an application.

FIG. 8 shows a screen shot of a Locate Database Files dialog box 805 from SQL Server Management Studio. In this example, the user has initiated a backup from within Microsoft SQL Server Management Studio by right clicking on the database name to be backed up and selecting from a resulting popup menu and submenu "Tasks"→"Backup" and selecting the name of the file for backup.

Figure 9:
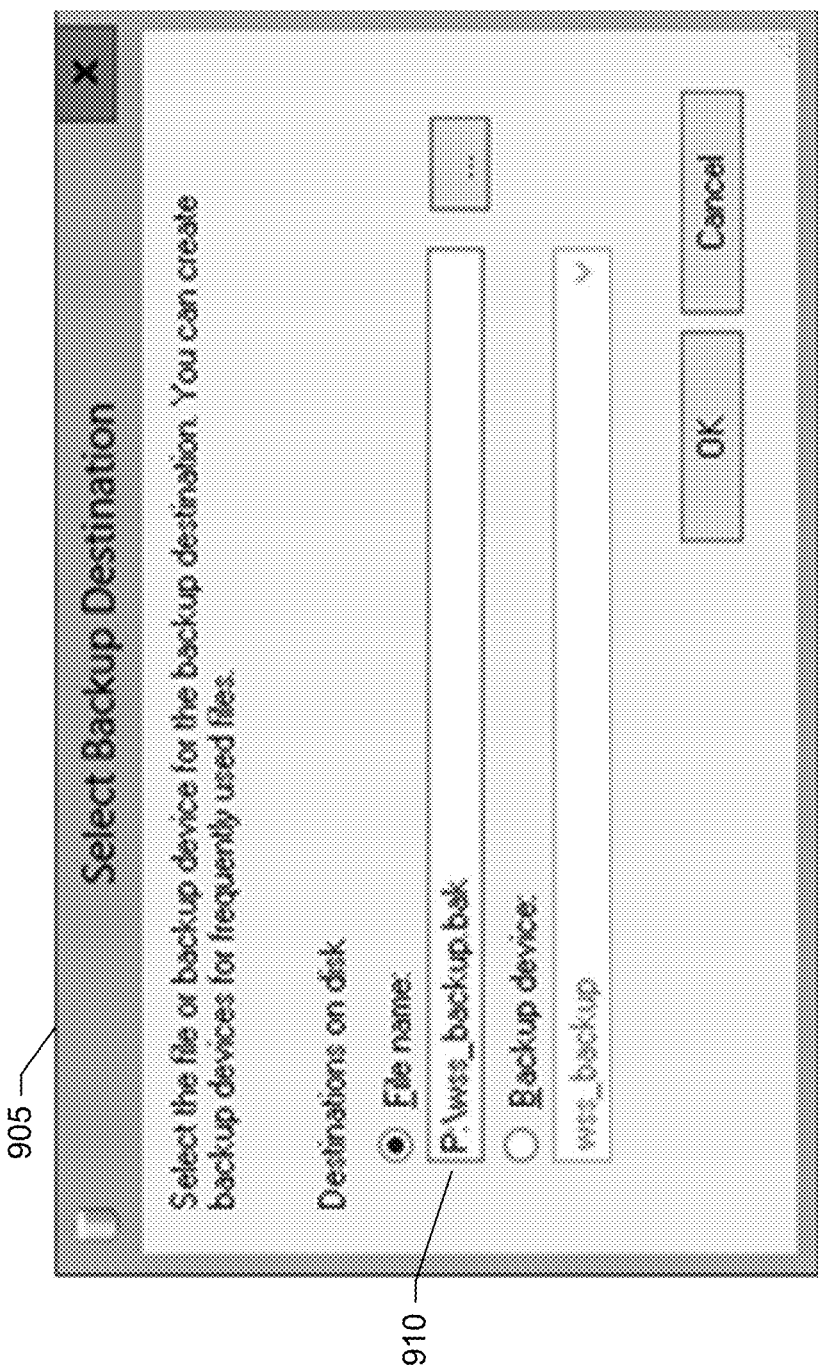
FIG. 9 shows an example of a screen shot for selecting a backup destination from within the application.

FIG. 9 shows a screen shot of a Select Backup Destination dialog box 905 from SQL Server Management Studio where the user has selected a virtual drive (e.g., "P:\") 910 as a target destination for the backup. In particular, after the user has selected the task "Backup" within SQL Server Management Studio, there can be a "Destination" section in another dialog box where the user can select an "Add" button to the select path to the virtual drive (e.g., "P:\").

Figure 10:
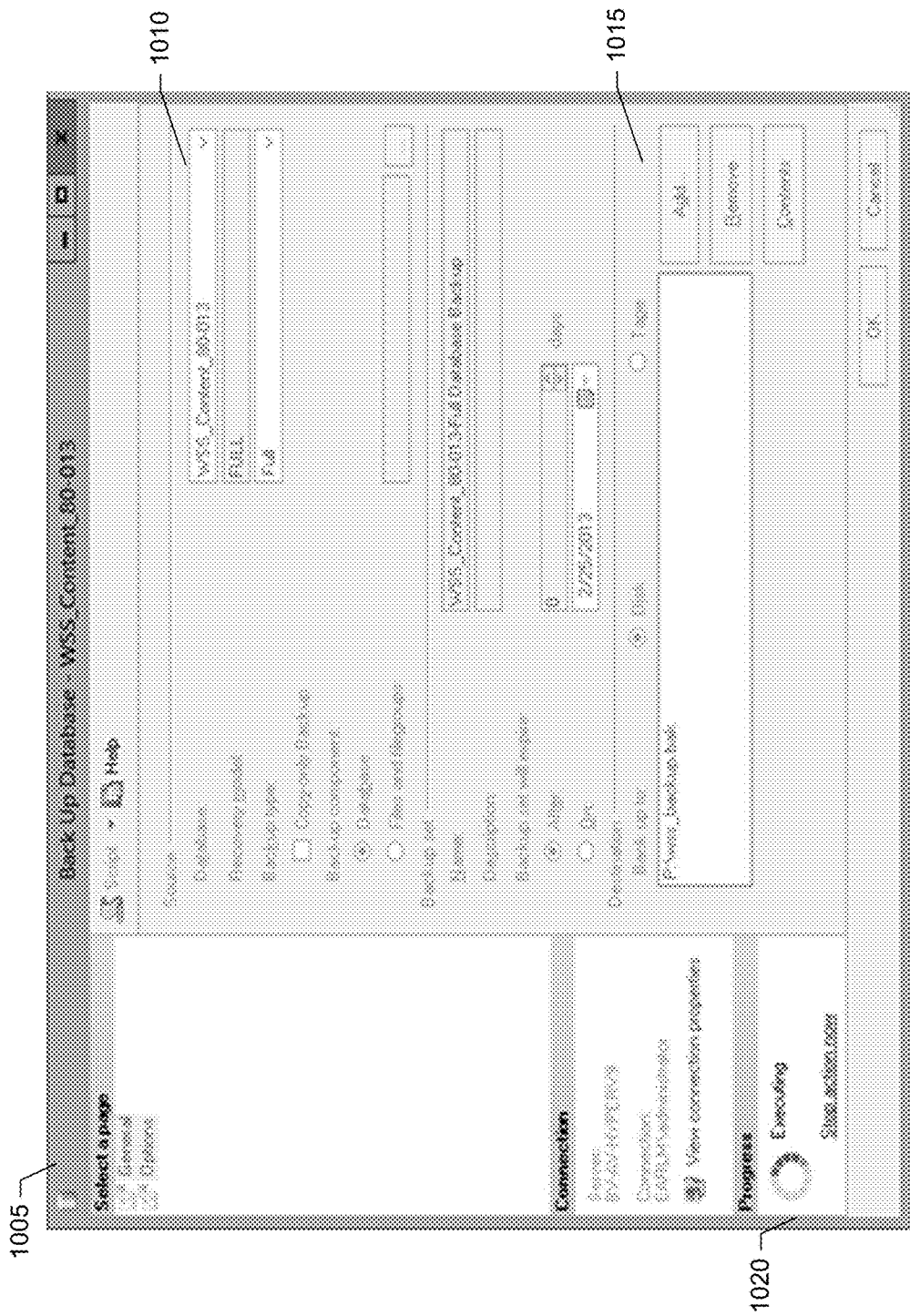
FIG. 10 shows an example of a screen shot from the application showing a status of the backup.

FIG. 10 shows a screen shot of a Backup Database dialog box 1005 from SQL Server Management Studio. The dialog box includes a section 1010 identifying a selected source of the backup (e.g., database "WSS_Content_80-013"), a section 1015 identifying a selected target destination drive and a name of the backup file (e.g., virtual drive and file "P:\wss_backup.bak"), and a section 1020 indicating a progress of the backup (e.g., "Executing").

Figures 11, 12:
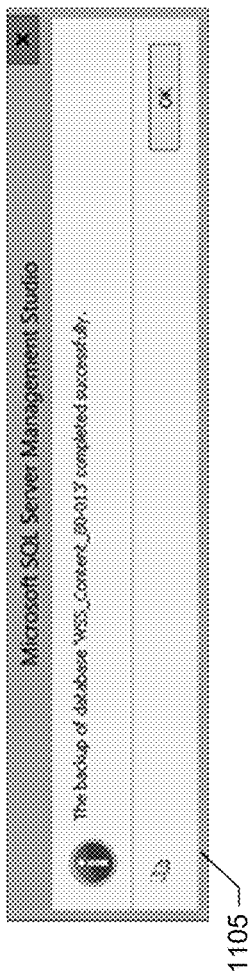
FIG. 11 shows an example of a screen shot from the application indicating that the backup has been completed.
FIG. 12 shows an example of a screen shot of the management console of the backup data management system that shows the data having been backed up to the data management system.

FIG. 11 shows a screen shot of a backup completion dialog box 1105 from SQL Server Management Studio indicating that the backup of the selected database (e.g., "The backup of database 'WSS_Content_80-013' completed successfully.").

FIG. 12 shows a screen shot of the Data Domain Enterprise Manager console showing a new status of storage unit 725 (e.g., "SqlBackupPs") as a result of the SQL database "WSS_Content_80-013" having been de-duplicated and backed up. The status shows, for example, 0.5 gigabytes having been written to the storage unit as a result of running the backup from SQL Server Management Studio against the virtual device.

In a specific embodiment, there is a method for accessing de-duplication services on a client, the method includes presenting to an application on the client a target destination for a backup initiated through the application, the backup comprising data managed by the application, and the target destination comprising a virtual drive, receiving data backed up by the application to the virtual drive, and directing the data backed up to the virtual drive to a de-duplication library executing on the client, where the de-duplication library is separate from the application.

The method may include providing a file system filter driver to be installed on the client, where the file system filter driver creates the virtual drive as the target destination for the backup. The directing the data may include dividing a data block backed up to the virtual drive into a set of chunks, and calling the de-duplication library to de-duplicate each chunk of the set of chunks. The method may include receiving at a file system filter driver the data backed up by the application to the virtual drive, and passing the data to the de-duplication library, where the de-duplication library executes in a user space of the client, and the file system filter driver executes in a kernel space of the client.

The application may include a backup tool that allows backups of files recognized by the application, and does not allow backups of other files not recognized by the application. The application may include a backup tool through which the backup is initiated, where the backup tool is native to the application and the de-duplication library is not native to the application.

In another specific embodiment, there is a system for accessing de-duplication services on a client, the system including a processor-based system executed on a computer system and configured to: present to an application on the client a target destination for a backup initiated through the application, the backup comprising data managed by the application, and the target destination comprising a virtual drive, receive data backed up by the application to the virtual drive, and direct the data backed up to the virtual drive to a de-duplication library executing on the client, where the de-duplication library is separate from the application.

In another specific embodiment, there is a computer program product, including a non-transitory computer-readable medium having a computer-readable program code embodied therein, the computer-readable program code adapted to be executed by one or more processors to implement a method including presenting to an application on the client a target destination for a backup initiated through the application, the backup including data managed by the application, and the target destination comprising a virtual drive, receiving data backed up by the application to the virtual drive, and directing the data backed up to the virtual drive to a de-duplication library executing on the client, where the de-duplication library is separate from the application.

In another specific embodiment, there is a method for accessing de-duplication services on a client during a backup of data stored in a file system of the client, the method including permitting a user to initiate the backup through a backup tool of an application on the client, providing a file system filter driver that exposes to the backup tool a virtual drive as a target device for the backup, intercepting, by the file system filter driver, a file system call issued by the backup tool and associated with a data path of the backup before the file system call is received by the file system, directing, based on the file system call, the data path of the backup to a de-duplication engine executing on the client to de-duplicate the data stored in the file system before the data is sent to a backup storage server, and sending, by the de-duplication engine, the de-duplicated data to the backup storage server, where the backup tool is native to the application, and the de-duplication engine is not native to the application.

The directing may include sending, by the de-duplication engine to the backup storage server, a request to create a backup file on the backup storage server for the backup. The directing may include receiving, by a callback routines module, the file system call intercepted by the file system filter driver, processing the file system call to generate a callback to the de-duplication engine, and issuing the callback to the de-duplication engine, where the callback routines module executes in a user space of the client and the file system filter driver executes in a kernel space of the client.

The method may include receiving, by a callback routines module from the file system filter driver, a data block to be written to a backup file on the backup storage server for the backup, dividing the data block into a set of chunks, and transmitting the set of chunks to the deduplication engine for deduplication processing.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for accessing de-duplication services on a client, the method comprising:
    allowing a user to initiate, from within a user interface of an application on the client, a backup of data generated by the application, the backup being initiated when the user selects a task from the user interface of the application to perform the backup; and
    accessing the de-duplication services during the backup, the accessing comprising:
        creating a virtual drive on the client;
        presenting to the application on the client a target destination for the backup initiated from within the application, the backup comprising the data generated by the application, and the target destination comprising the virtual drive created on the client, wherein the target destination comprising the virtual drive is displayed with a drive letter in the user interface of the application as a backup destination for the user to select after the user has selected the task to perform the backup;
        receiving, by a backup manager at the client, the data generated by the application and written by the application to the virtual drive created on the client, the virtual drive thereby being local to the client;
        after the receiving, directing the data written to the virtual drive on the client to a de-duplication library of the backup manager and executing on the client; and
        transmitting the de-duplicated data from the client, over a network, to a backup storage server, wherein the de-duplication library is called while the application is writing to the virtual drive, and
        wherein the de-duplication library and backup manager are independent from the application.

2. The method of claim 1 comprising:
    providing a file system filter driver to be installed on the client, wherein the file system filter driver creates the virtual drive as the target destination for the backup.

3. The method of claim 1 wherein the directing the data comprises:
    dividing a data block backed up to the virtual drive into a set of chunks; and
    calling the de-duplication library to de-duplicate each chunk of the set of chunks.

4. The method of claim 1 comprising:
    receiving at a file system filter driver the data backed up by the application to the virtual drive; and
    passing the data to the de-duplication library, wherein the de-duplication library executes in a user space of the client, and the file system filter driver executes in a kernel space of the client.

5. The method of claim 1 wherein the application comprises a backup tool that allows backups of files generated by the application, and does not allow backups of other files not generated by the application.

6. The method of claim 1 wherein the application comprises a backup tool for the user to initiate the backup of the data generated by the application, wherein the backup tool is native to the application and the de-duplication library is not native to the application.

7. A system for accessing de-duplication services on a client, the system comprising:
    a processor-based system executed on a computer system and configured to:
    allow a user to initiate, from within a user interface of an application on the client, a backup of data stored by the application, the backup being initiated when the user selects a task from the user interface of the application to perform the backup; and
    access the de-duplication services during the backup, the access comprising:
        create a virtual drive on the client;
        present to the application on the client a target destination for the backup initiated from within the application, the backup comprising the data stored by the application, and the target destination comprising the virtual drive created on the client, wherein the target destination comprising the virtual drive is displayed with a drive letter in the user interface of the application as a backup destination for the user to select after the user has selected the task to perform the backup;
        receive, by a backup manager at the client, the data stored by the application and written by the application to the virtual drive created on the client, the virtual drive thereby being local to the client;
        after the receipt, direct the data written to the virtual drive on the client to a de-duplication library of the backup manager and executing on the client; and
        transmit the de-duplicated data from the client, over a network, to a backup storage server, wherein the de-duplication library is called when the application writes to the virtual drive, and
        wherein the de-duplication library and backup manager are separate from the application.

8. The system of claim 7 wherein the processor-based system is configured to:
    install a file system filter driver on the client, wherein the file system filter driver creates the virtual drive as the target destination for the backup.

9. The system of claim 7 wherein the processor-based system is configured to:
    divide a data block backed up to the virtual drive into a set of chunks; and
    call the de-duplication library to de-duplicate each chunk of the set of chunks.

10. The system of claim 7 wherein the processor-based system is configured to:
    receive at a file system filter driver the data backed up by the application to the virtual drive; and
    pass the data to the de-duplication library, wherein the de-duplication library executes in a user space of the client, and the file system filter driver executes in a kernel space of the client.

11. The system of claim 7 wherein the application comprises a backup tool that allows backups of files stored by the application, and does not allow backups of other files not stored by the application.

12. The system of claim 7 wherein the application comprises a backup tool through which the backup is initiated, wherein the backup tool is native to the application and the de-duplication library is not native to the application.

13. A computer program product, comprising a non-transitory computer-readable medium having a computer-readable program code embodied therein, the computer-readable program code adapted to be executed by one or more processors to implement a method comprising:

allowing a user to initiate, from within a user interface of an application on a client, a backup of data created by the application, the backup being initiated when the user selects a task from the user interface of the application to perform the backup; and accessing de-duplication services during the backup by:
creating a virtual drive on the client;
while the client is connected to a backup storage server for the backup, presenting to the application on the client a target destination for the backup initiated from within the application, the backup comprising the data created by the application, and the target destination comprising the virtual drive created on the client;
receiving, by a backup manager at the client, the data created by the application and written by the application to the virtual drive created on the client, the virtual drive thereby being local to the client; and
after the receiving, directing the data written to the virtual drive on the client to a de-duplication library of the backup manager and executing on the client, wherein the de-duplication library is called while the application writes to the virtual drive, and wherein the de-duplication library and the backup manager are independent from the application.

14. The computer program product of claim 13 wherein the method comprises:
providing a file system filter driver to be installed on the client, wherein the file system filter driver creates the virtual drive as the target destination for the backup.

15. The computer program product of claim 13 wherein the directing the data comprises:

dividing a data block backed up to the virtual drive into a set of chunks; and
calling the de-duplication library to de-duplicate each chunk of the set of chunks.

16. The computer program product of claim 13 wherein the method comprises:
receiving at a file system filter driver the data backed up by the application to the virtual drive; and
passing the data to the de-duplication library, wherein the de-duplication library executes in a user space of the client, and the file system filter driver executes in a kernel space of the client.

17. The computer program product of claim 13 wherein the application comprises a backup tool that allows backups of files created by the application, and does not allow backups of other files not created by the application.

18. The computer program product of claim 13 wherein the application comprises a backup tool through which the backup is initiated, wherein the backup tool is native to the application and the de-duplication library is not native to the application.

19. The method of claim 1 wherein the data written by the application to the virtual drive comprises data not yet de-duplicated, the data that is written to the virtual drive thereby comprising redundant data.

20. The method of claim 1 wherein during the presenting, the application issues I/O operations causing an enumeration of the virtual drive to determine whether a file corresponding to the backup exists, a determination that the file does not exist, a creation of the file, and a writing to the file,
wherein a first I/O operation of the I/O operations is received by a file system filter driver resulting in a call to the de-duplication library to create the file on the backup storage server, and
wherein a second I/O operation of the I/O operations is received by the file system filter driver resulting in the de-duplication library executing a write call to the file created on the backup storage server.

* * * * *